US011881072B2

(12) United States Patent
Weng et al.

(10) Patent No.: US 11,881,072 B2
(45) Date of Patent: Jan. 23, 2024

(54) PAPER-SHEET HANDLING DEVICE

(71) Applicant: FUJITSU FRONTECH LIMITED, Tokyo (JP)

(72) Inventors: Yuqing Weng, Inagi (JP); Rompei Sugawara, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 17/870,082

(22) Filed: Jul. 21, 2022

(65) Prior Publication Data

US 2022/0358807 A1 Nov. 10, 2022

Related U.S. Application Data

(63) Continuation of application No. PCT/JP2020/002416, filed on Jan. 23, 2020.

(51) Int. Cl.
*G07D 11/30* (2019.01)
*G07D 11/12* (2019.01)

(52) U.S. Cl.
CPC ............. *G07D 11/30* (2019.01); *G07D 11/12* (2019.01)

(58) Field of Classification Search
CPC ........ G07D 11/30; G07D 11/12; G07D 11/40; G07D 11/20
See application file for complete search history.

(56) References Cited

U.S. PATENT DOCUMENTS

2002/0026550 A1 2/2002 Suzuki
2010/0177335 A1 7/2010 Oh
2018/0186587 A1 7/2018 Yamamoto

FOREIGN PATENT DOCUMENTS

WO WO 2017/046926 A1 3/2017
WO WO 2017/056271 A1 4/2017

OTHER PUBLICATIONS

Extended European Search Report dated Dec. 19, 2022 in corresponding European Patent Application No. 20915636.3 (7 pages).
International Search Report (Form PCT/ISA/210); dated Apr. 14, 2020 in corresponding PCT Application No. PCT/JP2020/002416 (3 pages) (2 pages English Translation).
Written Opinion (Form PCT/ISA/237); dated Apr. 14, 2020 in corresponding PCT Application No. PCT/JP2020/002416 (3 pages).
Chinese Office Action issued in corresponding Chinese Application No. 202080093671.0 dated Oct. 19, 2023.

*Primary Examiner* — Tuyen K Vo
(74) *Attorney, Agent, or Firm* — STAAS & HALSEY LLP

(57) ABSTRACT

A control unit transmits an initial value of a position ID to a cassette control unit at a top in a daisy chain by a serial line. Having received the position ID from the control unit or the cassette control unit of a previous stage in the daisy chain, the cassette control unit recognizes it as a position ID of its own cassette. Where there is a following cassette control unit in the daisy chain, the cassette control unit calculates a position ID of the following cassette control unit to transmit to the following cassette control unit.

2 Claims, 5 Drawing Sheets

PAPER-SHEET HANDLING DEVICE

CROSS-REFERENCE TO RELATED APPLICATION

This application is a continuation of International Application No. PCT/2020/002416, filed on Jan. 23, 2020, the entire contents of which are incorporated herein by reference.

FIELD

The present disclosure relates to a paper-sheet handling device.

BACKGROUND

Conventionally, paper-sheet handling devices that have plural types of cassettes have been available. The cassettes are paper-sheet handling units that handle paper sheets, such as bills and tradable coupons. As the cassettes, there are plural different types, paper sheet handling processes of which are different, such as a discrimination cassette that discriminates bills to be put in and taken out, a holding cassette that temporarily holds bills transferred from the discrimination cassette, a refill cassette in which bills to be put out are filled, and the like.

Examples of related-art are described in Japanese Patent Application Laid-open No. 2017-056271 and in Japanese Patent Application Laid-open No. 2017-046926.

A paper-sheet handling device includes a control unit that controls the paper-sheet handling device. Moreover, each of the cassettes includes a cassette control unit that controls the cassette based on an instruction of the control unit. The control unit needs to recognize a position identifier (ID) and a type of a cassette to be connected to the control unit, and communicates with the cassette control unit to recognize the position ID and the type.

FIG. 5 is a diagram illustrating a connection example of the control unit and the cassette control unit to recognize the position ID and the type. As illustrated in FIG. 5, a control unit 91 are connected to seven units of cassette control units 92 in daisy chain by seven pieces of cables 93. The control unit 91 transmits "1111110" to the first cassette control unit 92. In the first cassette control unit 92, "1111110" received by a connector 94 is subjected to a circular shift, and "1111101" is output from a connector 95. Moreover, a micro processing unit (MPU) 96 recognizes "1111110" received by the connecter 94 as a position ID of its own cassette.

In the second cassette control unit 92, "1111101" received by the connector 94 is subjected to a circular shift, and "1111011" is output from the connector 95. Moreover, the MPU 96 recognizes "1111101" received by the connecter 94 as a position ID of its own cassette.

Similarly, in the third to the sixth cassette control units 92, 7 bits received by the connector 94 is subjected to a circular shift, to be output from the connector 95. Moreover, the MPU 96 recognizes 7 bits received by the connector 94 as a position ID of its own cassette. Moreover, in the seventh cassette control unit 92, the MPU 96 recognizes 7 bits received by the connector 94 as a position ID of its own cassette.

The MPU 96 of each of the cassette control units 92 transmits the position ID and a cassette type to the control unit 91 by using another communication path. As described, because seven units of the cassette control units 92 are connected to the control unit 91 in daisy chain by seven pieces of the cables 93, and each of the cassette control units 92 subjects received 7 bits to a circular shift, to output to the cassette control unit 92, it can recognize a position ID of its own cassette, to notify the control unit 91. Moreover, the connection pattern of the connector 94 and the connector 95 can be all the same regardless of the position of the cassette control unit 92 in daisy chain and the type of the cassette control unit 92, and manufacturing of the cassette control unit 92 can be facilitated.

However, in such a recognition method, the number of position IDs is limited to the number of cables, and there is a problem that the expandability of the paper-sheet handling device is low. To increase the number of cassettes, it is necessary to also increase the number of cables 93.

SUMMARY

According to an aspect of an embodiment, a paper-sheet handling device includes a control unit that controls a plurality of paper-sheet handling units including paper-sheet handling units, paper sheet handling processes of which are different, and a plurality of first connection control units that control the respective paper-sheet handling units based on an instruction of the control unit, wherein the first control units are connected to the control unit by a first daisy chain, the first connection control unit positioned at a top in the first daisy chain receives a first numeral from the control unit, to recognize the first numeral as an identifier to identify a paper-sheet handling unit controlled by itself, and adds a second numeral to the first numeral to transmit to the first connection control unit, and the first connection control units except the first connection control unit positioned at the top in the first daisy chain receive the numeral transmitted by the first connection control unit of a previous stage, and recognize the transmitted numeral as an identifier to identify the paper-sheet handling unit controlled by themselves, and add the second numeral to the transmitted numeral, to transmit when the first connection control unit that follows is present, the following first connection control unit.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the present disclosure will be explained with reference to accompanying drawings.

Configuration of Paper-Sheet Handling Device

Figure 1:
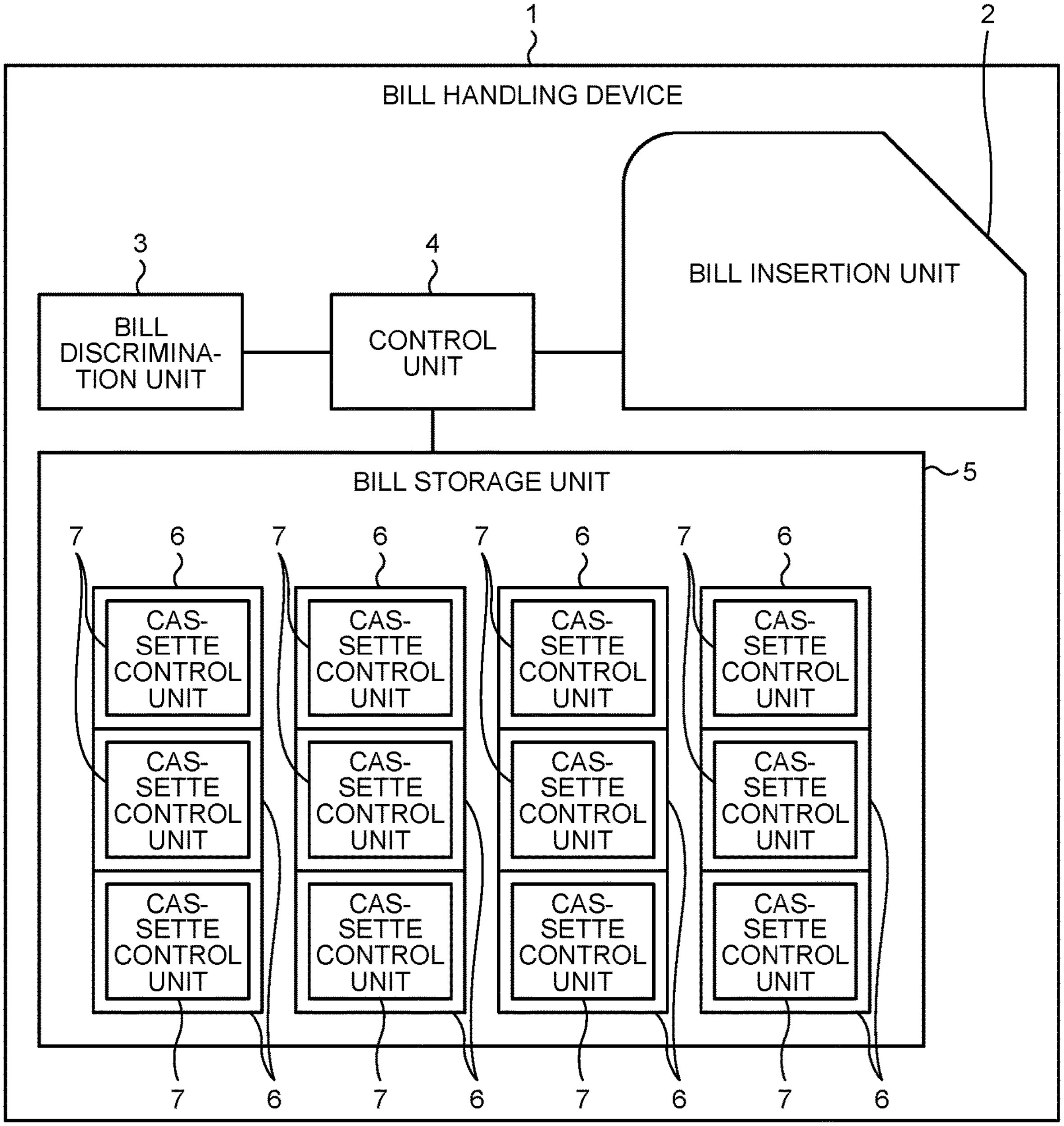
FIG. 1 is a diagram illustrating a configuration of a bill handling device according to an embodiment.

First, a configuration of a bill handling device will be explained as the paper-sheet handling device will be explained. FIG. 1 is a diagram illustrating a configuration of the bill handling device according to the embodiment. As illustrated in FIG. 1, a bill handling device 1 according to the embodiment includes a bill insertion unit 2, a bill discrimination unit 3, a control unit 4, and a bill storage unit 5.

The bill insertion unit 2 is a portion in which bills are inserted. The bill discrimination unit 3 discriminates bills inserted from the bill insertion unit 2. The control unit 4 controls the bill handling device 1. For example, the control unit 4 controls operation of respective cassettes 6. The control unit 4 is implemented by, for example, a printed circuit board (PCB) having an MPU.

The bill storage unit 5 stores bills. The bill storage unit 5 includes the plural cassettes 6. In FIG. 1, 12 cassettes 6 are included, but the bill handling device 1 may be configured to have more units of the cassette 6 or less units of the cassette 6. For example, the bill handling device 1 may have only four units of the cassettes 6 arranged in one dimension.

The cassette 6 is a unit handling bills. The cassette 6 includes plural different types in which bill handling processes are different, such as a holding cassette that temporarily holds bills transferred from the bill discrimination unit 3, and a refill cassette in which bills to be dispensed are filled.

Each of the respective cassettes 6 includes a cassette control unit 7. The cassette control unit 7 controls the cassette 6 of its own based on an instruction of the control unit 4. The cassette control unit 7 is implemented by, for example, a PCB having an MPU.

Recognition of Position ID

Figure 2:
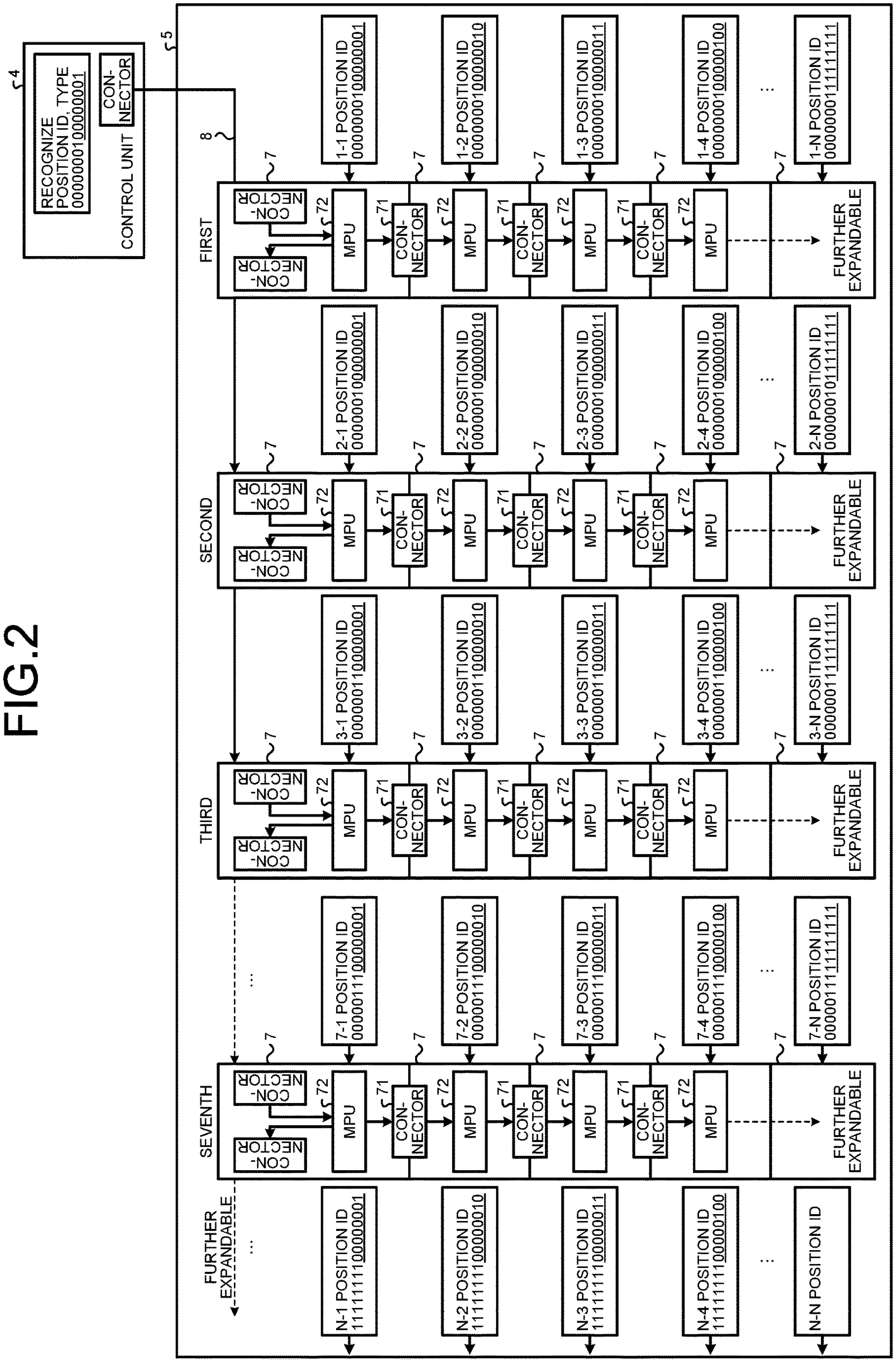
FIG. 2 is a diagram for explaining a method of recognizing a position ID of each cassette by a control unit.

Next, a method of recognizing a position ID of each of the cassettes 6 by the control unit 4 will be explained. FIG. 2 is a diagram for explaining a method of recognizing a position ID of each of the cassettes 6 by the control unit 4. In FIG. 2, in the bill storage unit 5, the cassette control units 7 are arranged in N rows and 7 columns, where N is a positive integer. Note that the number of columns is expandable up to N. Moreover, in this example, because a position in the column and a position in the row are expressed in 8 bits, N=255, but by changing the number of bits expressing a position in the column and a position in the row, N may be a positive integer other than 255.

The cassette control units 7 positioned at the highest level of the respective columns are connected in daisy chain by a serial line 8. Moreover, in each column, the respective cassette control units 7 are connected the cassette control unit 7 positioned at a lower level through a connector 71. Herein, the cassette control units 7 connected in daisy chain by the serial line 8 are referred to as first connection control unit, and the other cassette control units 7 are referred to as second connection control unit. Moreover, the daisy chain by the serial line 8 is referred to as first daisy chain, and a daisy chain through the connector 71 is referred to as second daisy chain. Furthermore, the respective cassette control units 7 have an MPU 72.

The control unit 4 transmits "0000000100000001" to the first connection control unit of the first column by using the first daisy chain. Upper bytes of "0000000100000001" indicate number of the column, and lower bytes thereof indicate number of the row. The MPU 72 of the first connection control unit of the first column recognizes "0000000100000001" as a position ID of the cassette 6 of its own. The MPU 72 of the first connection control unit of the first column then adds "0000000100000000" to the position ID of the cassette 6 of its own, and transmits "0000001000000001" to the first connection control unit of the second column by using daisy chain. Moreover, the MPU 72 of the first connection control unit of the first column adds "0000000000000001" to the position ID of the cassette 6 of its own, and transmits "0000000100000010" to the second connection control unit below by using the second daisy chain.

The MPU 72 of the first connection control unit of the second column that has received "0000001000000001" recognizes "0000001000000001" as the position ID of the cassette 6 of its own. The MPU 72 of the first connection control unit of the second column then adds "0000000100000000" to the position ID of the cassette 6 of its own, and transmits "0000001100000001" to the first connection control unit of the third column by using the first daisy chain. Moreover, the MPU 72 of the first connection control unit of the second column adds "0000000000000001" to the position ID of the cassette 6 of its own, and transmits "0000001000000010" to the second connection control unit below by using the second daisy chain.

Similarly, the MPUs 72 of the first connection control unit of the third to the seventh columns receive two byte data, and recognizes it as the position ID of the cassette 6 of their own. The MPUs 72 of the first connection control unit of the third to the sixth columns transmits two byte data obtained by adding "0000000100000000" to the position ID of the cassette 6 of their own to the first connection control unit of a following column by using the first daisy chain. Moreover, the MPUs 72 of the first connection control unit of the third to the seventh columns transmit two byte data obtained by adding "0000000000000001" to the position ID of the cassette 6 of their own to the second connection control unit below by using the second daisy chain.

The MPU 72 of the respective second connection control units receives two byte data from the first connection control unit or the second connection control unit above through the connector 71, and recognizes it as the position ID of the cassette 6 of its own. The MPUs 72 of the respective second connection control units transmit two byte data obtained by adding "0000000000000001" to the position ID of the cassette 6 of their own to the second connection control unit below by using the second daisy chain, if the second connection control unit is connected below through the connector 71.

As described, when there is the first connection control unit on the left, the first connection control unit transmits two byte data obtained by adding "0000000100000000" to the position ID of the cassette 6 of its own to the first connection control unit on the left by using the first daisy chain. Moreover, the first connection control unit transmits two byte data obtained by adding "0000000000000001" to the position ID of the cassette 6 of its own to the second control unit below by using the second daisy chain. Furthermore, the respective second connection control units transmit two byte data obtained by adding "0000000000000001" to the position ID of the cassette 6 of its own to the second connection control unit below by using the second daisy chain, if there is the second connection control unit below. Therefore, the MPUs 72 of all of the cassette control units 7 included in the bill storage unit 5 can recognize the position ID of the cassette 6 of their own. Accordingly, in the bill handling device 1 according to the embodiment, not limiting the number of the cassettes 6 included in the bill storage unit 5, all of the cassette control units 7 can recognize the position ID.

Command

Figures 3A, 3B:
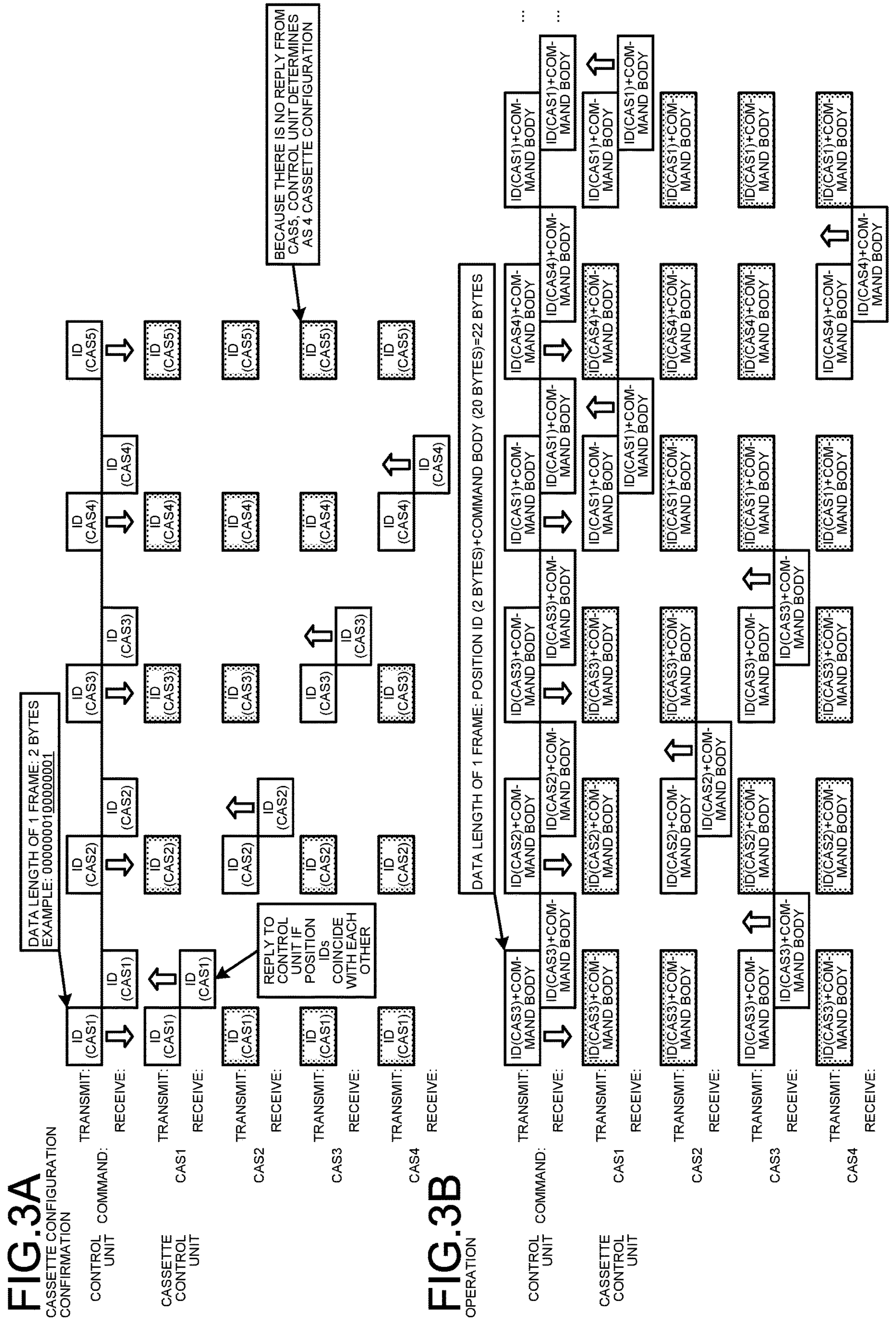
FIG. 3A is a diagram illustrating an example of commands used in communication between the control unit and a cassette control unit.
FIG. 3B is a diagram illustrating an example of commands used in communication between the control unit and a cassette control unit.

Next, an example of a command used in communication between the control unit 4 and the cassette control unit 7 will be explained. FIG. 3 is a diagram illustrating an example of commands used in communication between the control unit 4 and the cassette control unit 7. FIG. 3 (*a*) illustrates a configuration confirmation command of the cassette 6, and FIG. 3 (*b*) illustrates an operation command. Communication using a command between the control unit 4 and the cassette control unit 7 is performed by using a communication path different from the serial line 8. Moreover, FIG. 3 illustrates a case in which four units of the first connection control units are present, and the second connection control unit is not present. "CAS1" to "CAS4" are names of the cassette control unit 7.

As illustrated in FIG. 3 (*a*), the control unit 4 transmits "ID(CAS1)" to four units of the cassette control units 7 as a command. "ID(CAS1)" is a position ID of the cassette control unit 7, the name of which is "CAS1", and is "0000000100000001". That is, the configuration confirmation command only includes the position ID.

Having received the command, the cassette control unit 7, the name of which is "CAS1" responds to the control unit 4 with "ID(CAS1)" because "ID(CAS1)" coincides with the position ID of the cassette of its own. On the other hand, having received the command, the cassette control units 7, the name of which are "CAS2" to "CAS4" do not respond to the control unit 4 because "ID(CAS1)" does not coincide with the position ID of the cassette 6 of their own. The control unit 4 recognizes the presence of "CAS1" when "ID(CAS1)" is received as a response.

The control unit 4 transmits "ID(CAS2)" to four units of the cassette control units 7 as a command. Having received the command, the cassette control unit 7, the name of which is "CAS2" responds to the control unit 4 with "ID(CAS2)" because "ID(CAS2)" coincides with the position ID of the cassette 6 of its own. On the other hand, having received the command, the cassette control units 7, the name of which are "CAS1" and "CAS3" to "CAS4" do not respond to the control unit 4 because "ID(CAS2)" does not coincide with the position ID of the cassette 6 of their own. The control unit 4 recognizes the presence of "CAS2" when "ID (CAS2)" is received.

Similarly, the control unit 4 transmits "ID(CAS3)" to four units of the cassette control units 7 as a command, and recognizes the presence of the cassette control unit 7, the name of which is "CAS3", as it receives "ID(CAS3)" as a response. Moreover, the control unit 4 transmits "ID (CAS4)" to four units of the cassette control units 7 as a command, and recognizes the presence of the cassette control unit 7, the name of which is "CAS4", as it receives "ID(CAS4)" as a response.

The control unit 4 transmits "ID(CAS5)" to four units of the cassette control units 7 as a command. Because the cassette control unit 7, the position ID of which is "ID (CAS5)" is not present, the control unit 4 does not receive a response. The control unit 4 thus recognizes that the bill storage unit 5 has a four cassette configuration.

As described, by transmitting a configuration confirmation command after the respective cassette control units 7 recognize the position ID, the control unit 4 can recognize a cassette configuration of the bill storage unit 5. In this example, when the position ID of the cassette 6 of its own coincide with a position ID included in a command, only the position ID is returned, but the cassette control unit 7 may respond with the position ID and a cassette type.

As illustrated in FIG. 3 (*b*), when giving an instruction to a specific unit of the cassette 6, the control unit 4 transmits the position ID of the specific cassette 6 and a command body to all of the cassette control units 7. For example, when an instruction is to be given to the cassette control unit 7, the name of which is "CAS3", the control unit 4 transmits "ID(CAS3)□COMMAND BODY" to all of the cassette control units 7. The cassette control unit 7, the name of which is "CAS3" performs the command body and responds to the control unit 4 with "ID(CAS3)□COMMAND BODY" because the position ID of the cassette 6 of its own and the position ID included in the command coincide with each other. On the other hand, the cassette control units 7, the name of which are "CAS1", "CAS2", and "CAS4" take no action because the position ID of the cassette 6 of their own and the position ID included in the command do not coincide with each other.

Similarly, when an instruction is to be given to the cassette control unit 7, the name of which is "CAS2", the control unit 4 transmits "ID(CAS2)□COMMAND BODY" to all of the cassette control units 7. When an instruction is to be given to the cassette control unit 7, the name of which is "CAS1", the control unit 4 transmits "ID(CAS1)□COMMAND BODY" to all of the cassette control units 7. When an instruction is to be given to the cassette control unit 7, the name of which is "CAS4", the control unit 4 transmits "ID(CAS4)□COMMAND BODY" to all of the cassette control units 7.

As described, the control unit 4 can transmit an instruction to a specific unit of the cassette control unit 7 by transmitting a position ID by including it in a command to all of the cassette control units 7.

Flow of Processing

Figure 4:
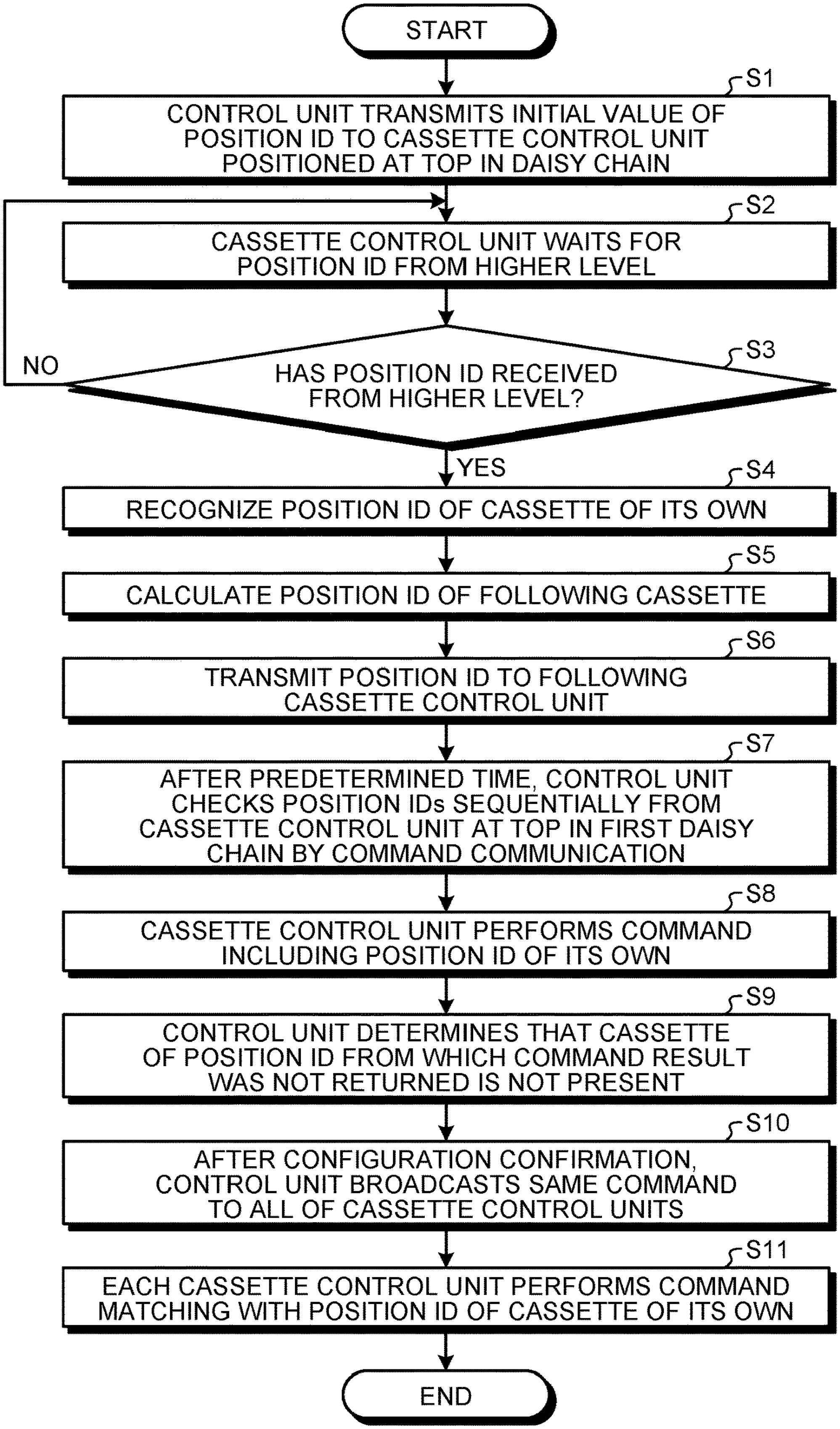
FIG. 4 is a flowchart illustrating a flow of processing performed by the bill handling device.
Figure 5:
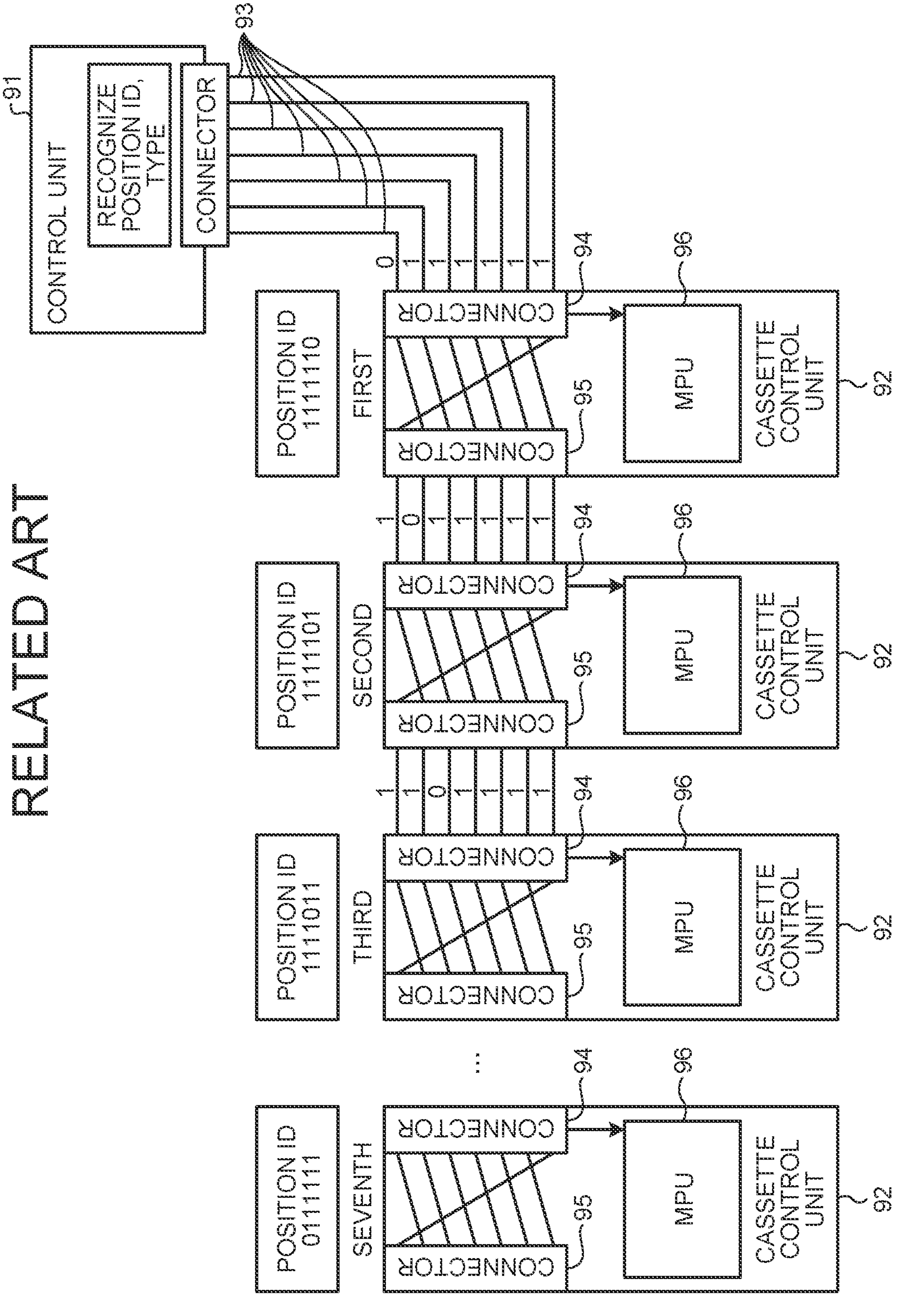
FIG.5 RELATED ART
FIG. 5 is a diagram illustrating a connection example of the control unit and the cassette control unit to recognize a position ID and a type.

Next, a flow of processing performed by the bill handling device 1 will be explained. FIG. 4 is a flowchart illustrating a flow of processing performed by the bill handling device 1. FIG. 4 illustrates a case in which only the first connection control unit is present, and the second control unit is not present. As illustrated in FIG. 4, the control unit 4 transmits an initial value of the position ID to the cassette control unit 7 positioned at the top of the first daisy chain (step S1).

On the other hand, the cassette control unit 7 waits for a position ID from a higher level (step S2). The higher level herein signifies the control unit 4 or the cassette control unit 7 positioned previously in the first daisy chain. The cassette control unit 7 determines whether a position ID has been received from the higher level (step S3), and when it has not been received (step S3: NO), it returns to step S2.

On the other hand, when a position ID has been received from the higher level (step S3: YES), the cassette control unit 7 recognizes the position ID of the cassette 6 of its own (step S4). When there is the following cassette control unit 7, the cassette control unit 7 calculates position ID of the following cassette 6 (step S5), and transmits the position ID to the following cassette control unit 7 (step S6). As a result, all of the cassette control units 7 recognize the position ID of their own.

After predetermined time, the control unit 4 checks the position IDs sequentially from the cassette control unit 7 at the top in the first daisy chain by the command communication (step S7). The cassette control unit 7 performs a command including the position ID of the cassette 6 of its own (step S8). Specifically, the cassette control unit 7 responds to the control unit 4 with the position ID of the cassette 6 of its own. The control unit 4 determines that the cassette 6 of a position ID from which a command result is not returned is not present (step S9).

After the configuration confirmation, the control unit 4 broadcasts the same command to all of the cassette control units 7 (step S10). The respective cassette control units 7 perform a command that coincides with the position ID of the cassette 6 of their own (step S11).

As described, by recognizing the cassette configuration of the bill storage unit 5 and the position IDs of the respective cassettes 6, the control unit 4 can give an instruction to a specific one of the cassette 6.

Effect of Embodiment

As described above, in the embodiment, the control unit 4 transmits an initial value of the position ID to the cassette control unit 7 at the top in the first daisy chain. Having received the position ID from the control unit 4 or the cassette control unit 7 of a previous level in the first daisy chain, the cassette control unit 7 recognizes it as the position ID of the cassette 6 of its own. When there is the cassette control unit 7 that follows in the first daisy chain, the cassette control unit 7 calculates a position ID of the following cassette control unit 7, to transmit to the following cassette control unit 7. Therefore, by transmitting the configuration confirmation command to all of the cassette control units 7, the control unit 4 can recognize the cassette configuration of the bill storage unit 5 and the position IDs of the respective cassettes 6. Thus, the number of cassettes 6 of the bill storage unit 5 can be flexibly changed, and the expansion of the bill handling device 1 can be facilitated.

Moreover, when the cassettes 6 are arranged two-dimensionally in the bill storage unit 5, the first connection control unit calculates a position ID of the second connection control unit at the top in the second daisy chain from the position ID of the cassette 6 of its own, to transmit to the second connection control unit at the top. Having received the position ID from the first connection control unit or the second connection control unit positioned previously in the second daisy chain, the second connection control unit recognizes it as the position ID of the cassette 6 of its own. When there is the second connection control unit that follows in the second daisy chain, the second connection control unit calculates a position ID of the following second connection control unit, and transmits it to the following second connection control unit. Therefore, the control unit 4 can recognize the cassette configuration of the bill storage unit 5 and the position IDs of the respective cassettes 6 also when the cassettes 6 are arranged two-dimensionally in the bill storage unit 5.

In the embodiment, the bill handling device 1 that handles bills has been explained, but the present invention is applied to devices that handle other kinds of paper sheets, such as tickets and coupons, in addition to, or instead of bills.

According to the disclosed embodiments, it is possible to facilitate expansion of a paper-sheet handling device.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A paper-sheet handling device comprising:

a control unit that controls a plurality of paper-sheet handling units including other paper-sheet handling units, paper sheet handling processes of which are different; and a plurality of first connection control units that control respective paper-sheet handling units of the paper-sheet handling units based on an instruction of the control unit, wherein respective control units connected to the control unit by a first daisy chain, a first connection control unit of the plurality of first connection control units positioned at a top in the first daisy chain receives a first numeral from the control unit, to recognize the first numeral as an identifier to identify a paper-sheet handling unit of the paper-sheet handling units controlled by itself, and adds a second numeral to the first numeral to transmit to a following first connection control unit, the plurality of first connection control units except the first connection control unit positioned at the top in the first daisy chain, receive the first numeral from the following first connection control unit of a previous stage, and recognize the first numeral as an identifier to identify a respective paper-sheet handling unit of the paper-sheet handling units controlled by themselves, and add the second numeral to the first numeral, to transmit when the first connection control unit that follows is present, to the following first connection control unit, the plurality of first connection control units are respectively connected to a plurality of second connection control units that respectively control the other paper-sheet handling units based on an instruction of the control unit by a second daisy chain which extends in a second direction different from a first direction in which the first daisy chain extends, and add a third numeral to an identifier to identify the paper-sheet handling unit controlled by themselves, to transmit to a second connection control unit of the plurality of second connection control units positioned at a top in the second daisy chain, and the plurality of second connection control units recognize the third numeral to identify a paper-sheet handling unit of the paper-sheet handling units controlled by themselves, and add the third numeral to the first numeral, to transmit, when the second connection control unit that follows is present in the second daisy chain, to a following second connection control unit.

2. The paper-sheet handling device according to claim 1, wherein the control unit recognizes a configuration of the paper-sheet handling unit by transmitting a numeral while adding the second numeral sequentially from the first numeral, to all of the plurality of first connection control units.

* * * * *